Oct. 20, 1964  P. BOSAK  3,153,377
MACHINE FOR COFFEE ROASTING, GRINDING AND COOKING
Filed Feb. 11, 1963  4 Sheets–Sheet 1
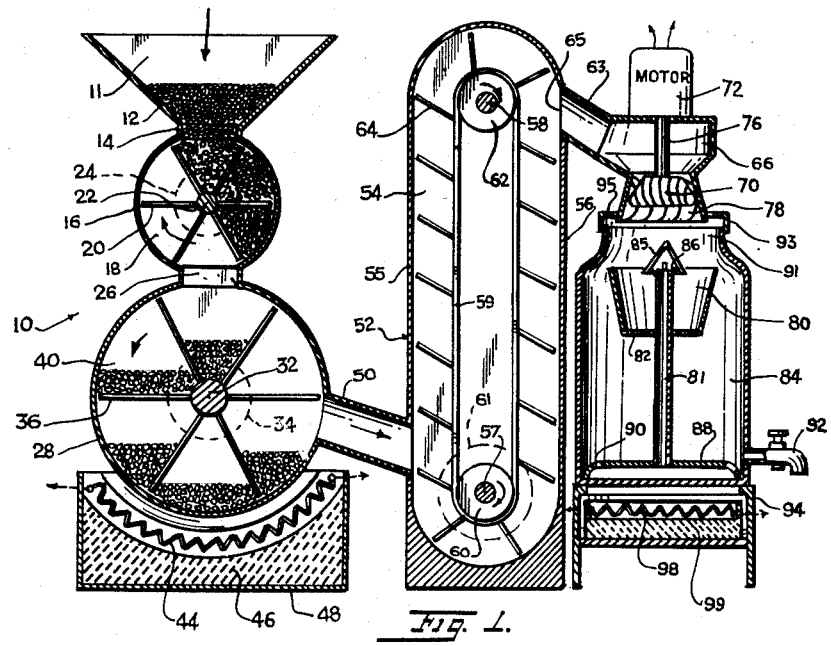
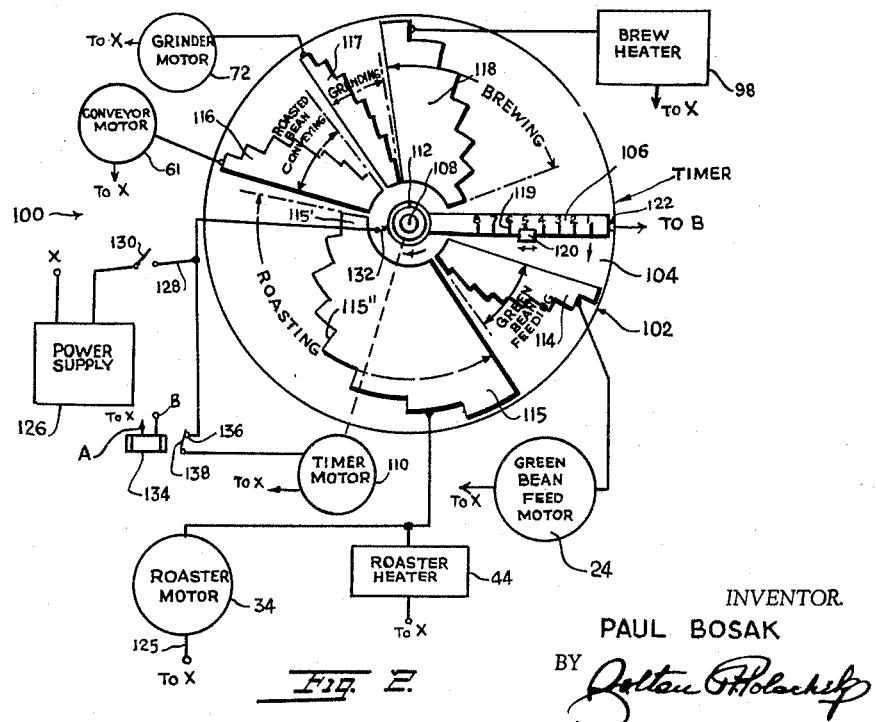
INVENTOR.
PAUL BOSAK
BY
ATTORNEY Oct. 20, 1964     P. BOSAK     3,153,377
MACHINE FOR COFFEE ROASTING, GRINDING AND COOKING
Filed Feb. 11, 1963     4 Sheets-Sheet 3
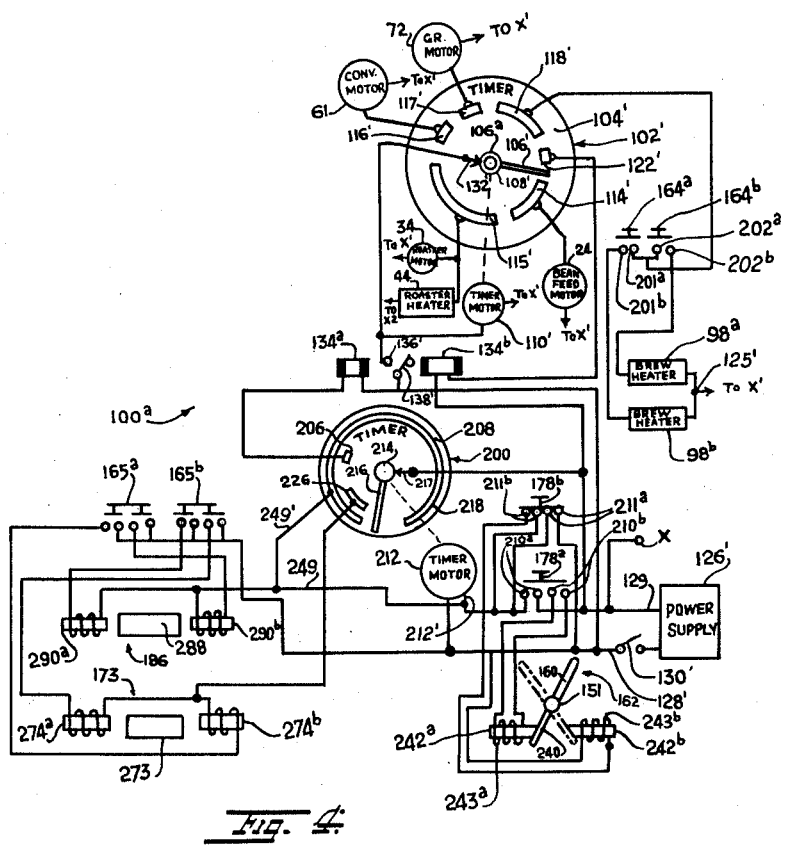
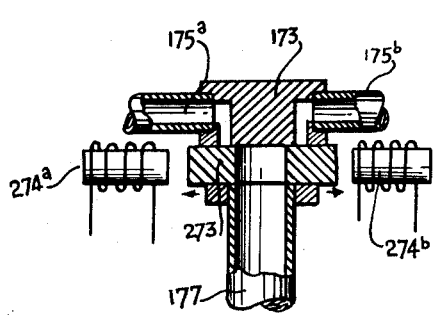
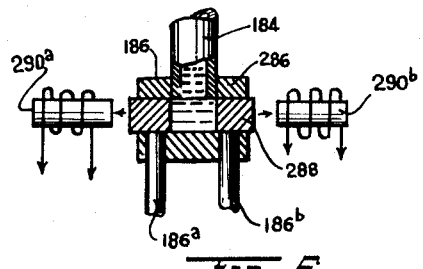
INVENTOR.
PAUL BOSAK
BY
*ATTORNEY*

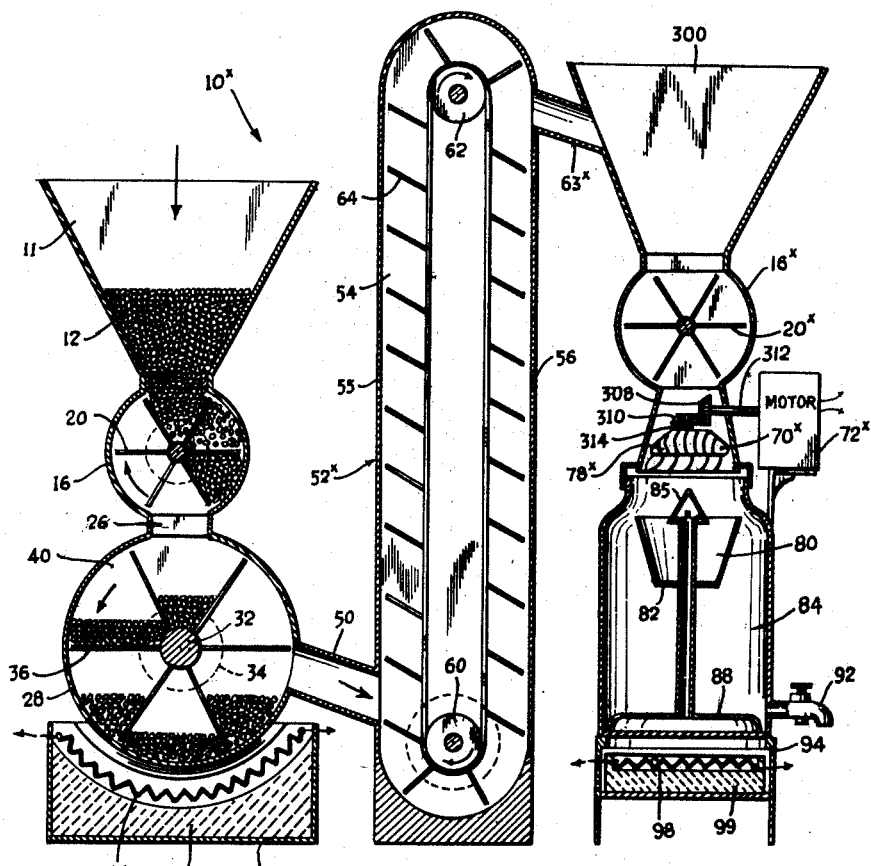
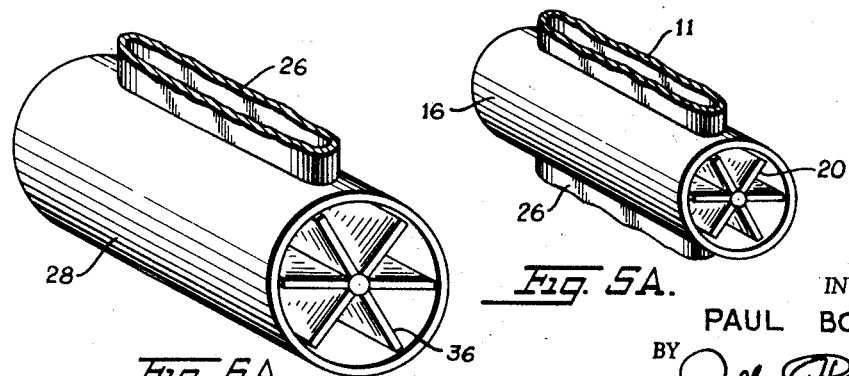

3,153,377
MACHINE FOR COFFEE ROASTING, GRINDING
AND COOKING
Paul Bosak, New York, N.Y.
(R.R. 1, Etna Green, Ind.)
Filed Feb. 11, 1963, Ser. No. 257,397
5 Claims. (Cl. 99—280)

This invention relates to the art of coffee brewing apparatus, and more particularly concerns a device for automatically roasting, grinding, and brewing coffee to produce a beverage of superior freshness and flavor.

According to the invention there is provided an apparatus which may be used in homes, restaurants, hotels and other places for brewing one or more cups of coffee. The apparatus automatically performs an entire cycle of roasting green coffee beans, grinding the roasted beans, and brewing the grind to produce the required quantity of beverage. Only enough green beans are dispensed from a supply as are required to brew the desired amount of beverage. By this means the consumer is assured of a beverage of superior freshness and flavor. Such beverage quality has not hitherto been available to the public.

The apparatus includes a hopper in which is placed a quantity of green coffee beans. Upon actuation of the apparatus, a predetermined quantity of the beans is fed to a roasting compartment where the beans are roasted. The roasted beans are then passed to a conveyor which carries the roasted beans to a grinder. The beans are ground and the pulverized grind is passed to a coffee percolator or other brewing device which operates automatically to infuse the ground coffee with heated water. The freshly brewed beverage is then available for instant consumption. The brewing device operates for a predetermined time to obtain a beverage of optimum strength.

In a modification of the invention, the apparatus supplies freshly roasted and ground coffee to two brewing devices in turn, when the beverage in each device is drawn off. Each brewing device is rinsed, spent grounds are discharged, the device is charged with fresh water and ground coffee, and the infusion is freshly prepared all in an automatically controlled cycle. This arrangement is desirable when large quantities of coffee beverage are to be brewed substantially continuously as may be required in restaurants and other public dining places.

It is therefore one object of the invention to provide apparatus for automatically roasting and grinding coffee beans and brewing coffee beverage therefrom in predetermined quantities.

Another object is to provide apparatus for continuously roasting green coffee beans, grinding the roasted beans, and brewing coffee beverage from the ground beans.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a vertical sectional view partially diagrammatic of an apparatus embodying the invention.

FIG. 2 is a diagram of the electrical control system of the apparatus.

FIG. 4 is a diagram of the electrical control system of the apparatus of FIG. 3.

FIGS. 5 and 6 are sectional views partially schematic of electrically operated valves employed in the apparatus.

FIG. 5A is a perspective view of the cylindrical dispenser. FIG. 6A is a perspective view of the roaster drum.

FIG. 7 is a view similar to FIG. 1 showing a coffee brewing apparatus embodying another modification.

Figure 3:
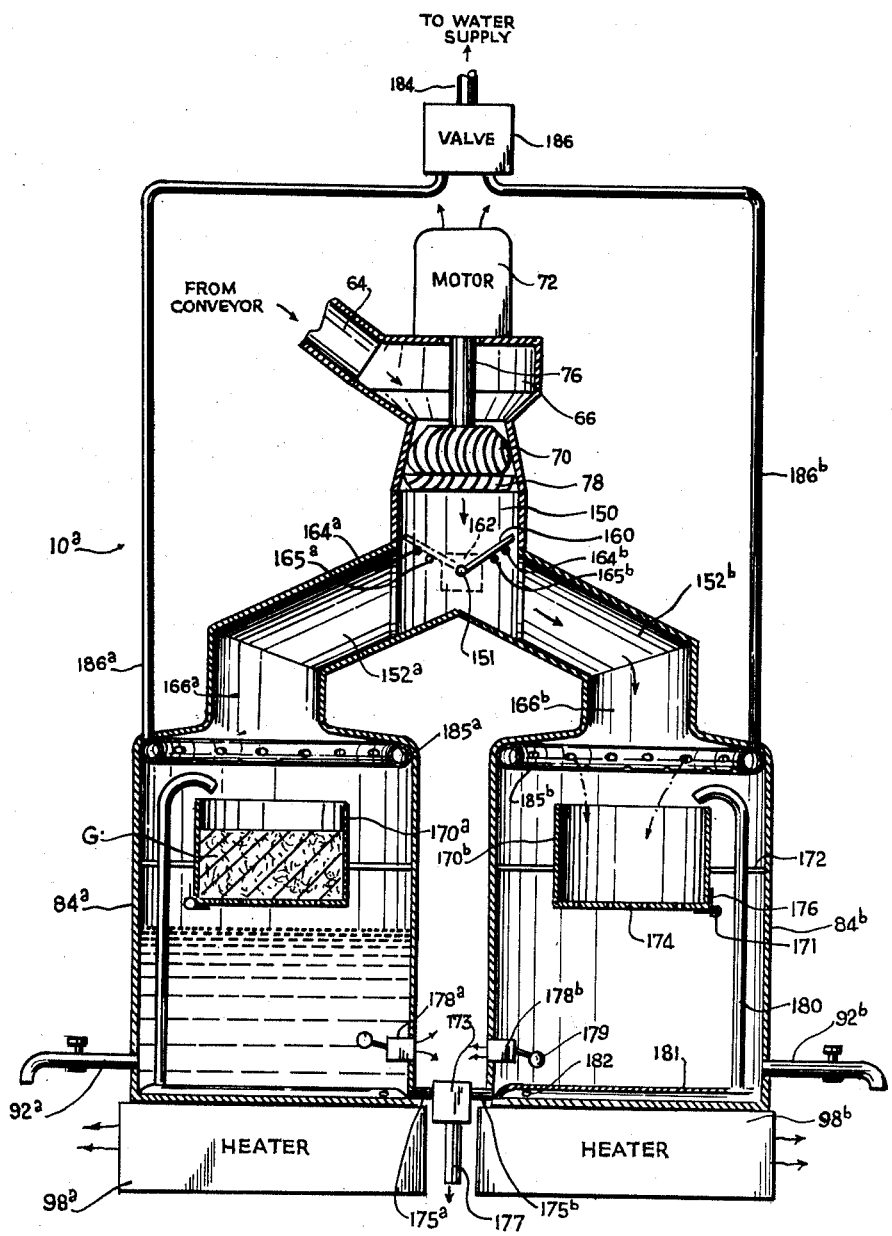
FIG. 3 is a vertical sectional view partially diagrammatic of another apparatus according to the invention.

Referring to FIG. 1, there is shown in apparatus 10 a funnel-like hopper 11 into which green coffee beans 12 can be loaded. The hopper is supported by a neck 14 at the upper open side of a cylindrical dispenser 16 for the beans. The dispenser has a generally cylindrical body which is axially horizontal with flat vertical end walls 18. A rotor having multiple vanes or blades 20 is rotatably mounted in the dispenser. The rotor has a shaft 22 carrying the blades. The blades are angularly disposed to each other to define compartments between each pair of blades, the end walls of the dispenser and the cylindrical body of the dispenser. The rotor is driven by a motor 24 via a suitable speed reducing gear train indicated schematically in the drawing.

At its lower side, the dispenser opens via a narrow neck or passage 26 into the upper side of an axially horizontal cylindrical roaster drum 28. Inside the drum is a rotor including a shaft 32 driven by a motor 34 and suitable speed reducing gear train. Blades 36 extend radially of the shaft in the drum and define compartments therebetween with outer flat end walls 40 and the cylindrical body of the drum. Underneath the drum is a roaster heater. This heater includes a heater element 44 mounted on a ceramic base 46 in a casing 48. While an electric heater is shown, any other suitable form of heater may be used.

A duct 50 opens laterally of the drum into one side of a conveyor housing 52. The housing is a generally rectangular hollow body with flat opposing front and rear walls 54 and flat lateral walls 55, 56. Duct 50 opens through the wall 55 near the bottom end thereof. A pair of axially horizontal shafts 57, 58 are rotatably mounted on the walls 54 near top and bottom ends of the conveyor. A flexible belt 59 is entrained on rollers 60, 62 carried by the two shafts respectively. Flat blades or plates 64 extend outwardly of the belt and define a plurality of compartments between the walls 54, wall 55 or 56 and the belt. A motor 61 including a speed reducing gear train drives shaft 57 and belt 59.

A duct 63 is connected to the conveyor housing at an opening 65 in wall 56. The duct descends to upper chamber 66 of a grinder. This grinder has a rotor 70 driven by a motor 72 via a shaft 76. The rotor turns in a grooved grinder compartment 78 and grinds coffee beans therein. The grinder may be of a type such as described in Patent 1,189,035.

The grinder has an open bottom which discharges ground coffee into a basket 80 carried on an upright tube 81 in a percolator container 84. The bottom 82 of the basket is perforated so that hot water discharged out of the open top of the tube drains through the ground coffee in the basket. At the top of the tube is a conical baffle 85 which prevents ground coffee from falling into the tube while serving as a deflector for hot water rising up out of the tube. The baffle 85 is supported by stays 86 above the tube. The tube is carried by a percolator base 88 having a hole 90 through which hot water in the container enters. A faucet 92 near the bottom of the container is used to draw off brewed coffee.

The container rests on a stand 94 carrying a heater which includes a heater element 98 on a ceramic base 99. Any other suitable heater may be used. The container has a movable top 95 with a depending cylindrical flange 93 at neck 91 of the container. The top can be raised to permit the container to be moved laterally off of the stand 94 for replacement by another container when desired.

FIG. 2 shows a control system 100 employed for the apparatus of FIG. 1. This system includes a timer 102 having a circular insulated timer disc 104 on which is a rotary electrically conductive arm 106 carried by a rotary shaft 108. The shaft is driven by a timer motor 110. A knob 112 on the shaft permits manual movement or positioning of the arm at any desired position around the disc. On the disc are circumferentially spaced electrically conductive sector plates 114–118. These plates are contacted by a slider contact 120 carried by arm 106. The slider contact moves along scale 119 on arm 106. Arm 106 is spaced above the plates and does not contact them. The arm does contact at its end a fixed electrical contact lug 122 located at the periphery of the disc. Lug 122 is located between the spaced plates 114 and 118.

Plate 114 is connected to the green bean feed motor 24. Plate 115 is connected to both the roaster heater 44 and the roaster motor 34. Plate 116 is connected to conveyor motor 61. Plate 117 is connected to the grinder motor 72. Plate 118 is connected to the brew heater 98. All the motors and heaters have terminals 125 which terminate at terminal X of a suitable electrical power supply 126. In series with line 128 of the power supply is a switch 130. Line 128 is connected to a wiper contact 132 which makes continuous contact with the arm 106. A relay 134 has its coil terminal A connected to terminal X and its other terminal B is connected to contact lug 122. The relay has a fixed contact 136 connected to power line 128 and a movable contact 138 conected to the timer motor 110.

In operation of the system 100 and the apparatus 10, an operator will set slider 120 along arm at any indication of scale indicative of the number of cups of coffee to be brewed. This may be as little as one cup, and may be as much as eight cups. If a larger quantity of coffee is to be brewed, the apparatus may be constructed in a larger size for this purpose. Slider 120 is shown set at numeral "5" on the scale 119 indicating that four cups of coffee are to be brewed. The switch 130 will be then manually closed and the arm 106 will be moved manually by turning knob 112 so that arm 106 passes contact 122. At this instant the timer motor 110 will be energized and relay 134 will be deenergized. The motor then rotates arm 106 at a predetermined constant speed. The motor 110 will include a speed reducer so that the arm 106 will complete a revolution in approximately an hour.

It will be noted that sector plate 114 is step shaped so that at its radially outer end it extends through a smaller number of degrees of arc than at its radially inner end. Thus at outer index line "1" the slider 120 contacts plate 114 for the shortest length of time while at the inner index line "5" slider 120 contacts plate 114 for the longest length of time. While slider 120 contacts plate 114, the motor 24 is energized and the green beans are passed from hopper 11 through dispenser drum 16 to the roaster drum 28. The quantity of beans passed will depend on the length of time motor 24 is energized. The motor 24 is deenergized and roaster motor 34 is energized when the arm 106 and slider 120 pass to plate 115. The roaster heater 44 is also energized and roasting takes place for a length of time depending on the radial position of slider 120 on arm 106. Plate 115 is step shaped and its radially inner step 115' extends the shortest number of degrees of arc while intermediate step 115" extends the greatest number of degrees of arc.

The green beans in the roaster drum 28 will be roasted for a predetermined length of time and the beans will be passed on to the conveyor 55. The conveyor motor 61 will be energized via its step shaped plate 116 and will pass the roasted beans to the grinder chamber 66. Then grinder motor 72 will be energized via its step shaped plate to grind the roasted beans. Grinding is completed by the time the grinder motor stops. When the motor 72 stops the heater 98 is energized via its step shaped plate 118. Container 84 has previously been filled with fresh water. The ground coffee is deposited directly into basket 80. The water is heated by heater 98 and the hot water percolates through the coffee grounds for a predetermined length determined by the arcuate length of the plate 118 at which slider 120 is set. When the arm 106 passes the plate 118 it encounters contact 122 which closes the circuit of relay 134. This opens the timer motor circuit via normally closed contacts 136, 138 and the timer motor stops at this point. The brewed coffee can be drawn off via faucet 92 after brewing is completed. The container of brewed coffee can be removed and another container of fresh water can be placed on stand 94 to begin another cycle of coffee bean dispensing, roasting, grinding and blending immediately; or the two containers for liquid coffee can be mounted on the heaters, and before the first container is drawn off, the second container can be put on for immediate brewing of fresh coffee.

In FIG. 3 is shown part of another coffee brewing apparatus in which the hopper, bean dispenser, roaster, conveyor and grinder are the same as illustrated in FIG. 1, and are therefore omitted from FIG. 3. The grinder is driven by motor 72 and the ground coffee drops down through a duct 150 to either of two branch chutes 152$^a$ or 152$^b$. A baffle or valve plate 160 is pivotally mounted in the duct 150 on a shaft 151 and is driven by a solenoid motor 162 either to the right or left as seen in FIG. 3. If the plate 160 is turned to the right as shown, the ground coffee will drop down through chute 152$^a$. If the plate 160 is turned to the left the ground coffee will drop down through chute 152$^b$. Each time the motor is actuated it changes the position of the plate 160 either from right to left or from left to right. As the baffle plate 160 is turned fully to the right or left it closes push button switches 164$^a$, 165$^a$ or 164$^b$, 165$^b$.

The necks 166$^a$, 166$^b$ of two containers 84$^a$, 84$^b$ are connected to the respective chutes. The containers are supported on heaters 98$^a$ and 98$^b$, respectively. In the containers are cylindrical baskets 170$^a$, 170$^b$ supported by radial stay bars 172. The perforated bottom plates 174 of the baskets are supported on hinges 171 and are held closed by springs 176. When the baskets are full of ground coffee G the plates 174 are in the closed positions shown in the drawing.

At the bottoms of the containers are drain pipes 175$^a$, 175$^b$ connected to an electrically operated two-way drain valve 173 which opens either of the pipes so that the open pipe is connected to common drain 177. FIG. 5 shows pipes 175$^a$, 175$^b$ connected to the body of valve 173 in which is a movable magnetic piston 273 which can be actuated by electromagnet 274$^a$ or 274$^b$ depending on which electromagnet is energized. The drain 177 is cut off from the pipes 175$^a$, 175$^b$ in the neutral position of the piston. The picton 273 normally assumes a spring biased neutral position when neither electromagnet is energized.

A float switch 178$^a$ or 178$^b$ is provided in each container. The switch is actuated when the float 179 of the float switch is lowered as shown in container 84$^b$ and when the float is raised as shown in container 84$^a$.

A water supply tube 180 is provided in each container. The upper end of the tube is bent and discharges hot water into the basket 170$^a$ or 170$^b$. The tubes 180 are carried by curved base plates 181 in which is a hole 182 to admit hot water.

At the top of each container is a perforated pipe ring 185$^a$ or 185$^b$ connected to water supply pipe 184 via a branch pipe 186$^a$ or 186$^b$ and an electrically operated valve 186. Valve 186 as shown in FIG. 6 has a body 286 in which is a slidable piston 288 normally assuming a spring biased neutral position in which supply pipe 184 is cut off from pipes 186$^a$ and 186$^b$. An electromagnet 290$^a$ will move the piston to connect pipe 184 to pipe 186$^a$ and electromagnet 290$^b$ will move the piston to connect pipe 184 to pipe 186$^b$. When the electromagnets are deenergized the water supply is cut off from the pipes 186$^a$, 186$^b$. Each container is provided with a manually operable faucet 92$^a$ or 92$^b$ for drawing off brewed coffee.

FIG. 4 shows control system 100$^a$ diagrammatically. Parts which correspond to those of system 100 are identically numbered. Two timers 102′ and 200 are provided. Timer 102′ has an insulated plate 104′ provided with arcuate contacts 114′–118′ plus an additional contact 122′. Contact 114′ is connected to the bean feed motor 24. Contact 115′ is connected to the roaster motor 34 and roaster heater 44. Contact 116′ is connected to conveyor motor 61. Contact 117′ is connected to the grinder motor 72. Contact 118′ is connected to two contacts 201$^a$, 202$^a$ of the two push button switches 164$^a$, 164$^b$. Contact 201$^b$ is connected to brew heater 98$^b$ and contact 202$^b$ is connected to brew heater 98$^a$. All the motors and heaters have terminals 125′ connected to terminal X′ of power supply 126′. The power supply has a manually operable switch 130′ for turning the system on and off.

On insulated plate 104′ is a rotary conductive arm 106′ carried by a shaft 108′. Timer motor 110′ drives shaft 108′. A wiper contact 132′ makes continuous contact with ring 106$^a$ mounting the arm 106′ on the shaft. Contact 132′ is connected to contact 136′ of double relay 134$^a$, 134$^b$. Movable contact 138′ of the relay is connected to power line 126′ and to the coil of relay section 134$^a$. The coil of relay section 134$^a$ is also connected to a contact 206 on insulated plate 208 of timer 200. The coil of relay section 134$^b$ is connected between contact 122′ and power line 129. The timer motor 110′ is also connected to contact 136′.

Switch contacts 210$^a$ of float switch 178$^a$ and switch contacts 211$^a$ of float valve 178$^b$ are connected in parallel between the timer motor 212 and power supply 126′. The timer motor 212 drives shaft 214 carrying a radial contact arm 216. A wiper contact 217 makes continuous contact with arm 216 and is connected to power line 129. On plate 208 is a circumferentially long arcuate contact 218 connected to the coils of electromagnets 290$^a$, 290$^b$. The electromagnet coils are connected to two contacts of push button switches 165$^b$ and 165$^a$, respectively. The power supply line 126′ is connected to each of the switches 165$^a$, 165$^b$.

Drain valve 173 has electromagnet 274$^a$ connected to a contact of push button switch 165$^b$ while electromagnet 274$^b$ is connected to a contact of switch 165$^a$. The electromagnets are also connected to a contact 226 on disc 208. Contact 226 is adajcent to and is shorter than contact 218.

The chute motor 162 includes pivotally mounted shaft 151 on which is supported plate 160. The shaft has a depending radial arm 240 formed of magnetic material and disposed to be attracted by either of two electromagnets 242$^a$ or 242$^b$ axially aligned with each other. Coil 243$^a$ is connected to contacts 210$^b$ of switch 178$^a$ and coil 243$^b$ is connected to contacts 211$^b$ of switch 178$^b$.

In operation of the apparatus 10$^a$ and control system 100$^a$, suppose the apparatus is in the condition shown in FIG. 3. The beverage has been drawn out of container 84$^b$ through faucet 92$^b$ and the float 179 is lowered. This causes the closing of contacts 211$^a$, 211$^b$ by the movable shorting bar in the switch 178$^b$. Switch 130′ will be manually closed to apply power to the system. The switch contacts 211$^b$ when closed energize coil 243$^b$ and electromagnet 242$^b$ will attract bar 240 to swing the plate 160 to the left indicated by the dotted line in FIG. 3. At the same time plate 160 will close switches 164$^a$, 165$^a$. Switch 164$^a$ is in circuit with heater 98$^b$. The timer motor 212 is energized via contacts 211$^a$, and the shaft 214 and arm 216 are driven. The drain valve 173 opens pipe 175$^b$ since electromagnet 274$^b$ is energized via contact 226. At the same time valve 186 is operated to connect the water supply pipe 184 to ring 185$^b$.

The water valve electromagnet 290$^b$ is energized via contact 218. The arm 216 makes contact with contact 218 during rotation of the arm. When the arm 216 leaves contact 218 the electromagnet 290$^b$ is deenergized and the piston 288 returns to its neutral position cutting off the water supply. While the water is flowing it flows down the sides of the container 84$^b$ to rinse it. The water may initially overflow the basket carrying the grounds with it. In any event the spent grounds and excess water will all be drained out of open pipe 175$^b$. The drain valve will close after a predetermined time as arm 216 leaves contact 226. Then the container 84$^b$ fills with fresh water. The water is cut off when the container is filled to desired level. As the water level rises it raises the float which opens switch 178$^b$. However, the timer motor will remain energized through a holding circuit connection 249 connected to contact 18 by wire 249′ and to timer motor by wire 212′. As arm 216 leaves contact 218, the motor 212 is cut off. The arm 216 leaves contact 218 due to its inertia at the instant motor 212 is cut off. When switch 178$^b$ opens, the electromagnet 243$^b$ is deenergized but the plate 160 remains in place to the left with arm 240 against the bar 242$^b$ and will remain there until electromagnet bar 242$^a$ is activated.

When arm 216 reaches contact 206, relay section 134$^a$ is activated and contacts 136′, 138′ close to energize the timer motor 110′. Relay section 134$^b$ is deenergized. When timer motor 110′ starts arm 106′ encounters the bean feed motor contact 114′ and the beans are fed to roaster drum as explained in connection with FIG. 1. When arm 106′ leaves contact 114′ it reaches contact 115′ and both the roaster heater 44 and roaster motor 34 are energized. When arm 106′ reaches contact 116′ the conveyor motor 61 is energized. When arm 106′ reaches contact 117′ the grinder motor is energized. Ground roasted coffee then passes down the open chute 152$^b$. When arm 106′ reaches contact 118′ the brewer heater 98$^b$ is energized, since switch 164$^a$ has previously been closed by plate 160 in the left position of FIG. 3. Percolating of the beverage in container 84$^b$ continues until arm 106′ leaves contact 118′. The beverage is then ready for service and may be drawn off through faucet 92$^b$. When arm 106′ reaches contact 122′ the relay section 134$^b$ is energized and the contacts 136′, 138′ are opened to stop the timer motor 110′. The arm 106′ moves off contact 122′ due to inertia leaving the contacts 136′, 138′ open and the timer motor 110′ off.

When all beverage has been drawn off from container 84$^a$ it is then washed, filled with water, and fresh roasted and ground coffee is supplied in the manner described in connection with container 84$^b$ above. Heater 98$^a$ is energized as plate 160 is turned to the right upon the operation of float switch 178$^a$, and valve 173 opens drain pipe 175$^a$ while closing pipe 175$^c$.

The apparatus of FIGS. 3 and 4 operates to keep freshly brewed coffee in either one of the containers while brewing coffee for the other container. If desired, the timer 102 of apparatus 10 may be substituted for the timer 102′.

This arrangement will permit an adjustable amount of coffee to be brewed for each container instead of the fixed amount determined by the contacts 114′–118′. If desired, gas heaters having electrically controlled valves can be substituted for the electrical heaters 44, 98, 98$^a$ and 98$^b$.

The modified form of coffee brewing apparatus 10$^x$ shown in FIG. 7 differs from the apparatus 10 in that a funnel-like hopper 300 and an associated dispenser 16$^x$ are interposed between the duct 63$^x$ leading from the conveyor housing 52$^x$ and the grinder compartment 78$^x$. The purpose of the hoper 300 is for holding a supply of roasted coffee so as to have a supply on hand for immediate use. The dispenser 16$^x$ is constructed similarly to dispenser 16, having a rotor including multiple vanes of blades 20$^x$, the rotor being operatively connected to the motor 24.

In this form of apparatus 10$^x$, the grinder has a single groved grinder compartment 78$^x$ and the roasted coffee beans from the hopper 300 are ground therein by means of a rotor 70$^x$ driven by a motor 72$^x$ via intermeshing gears 308, 310 on shafts 312, 314, respectively.

In all other respects, the apparatus 10$^x$ is similar to the apparatus 10 and similar reference numerals are used to indicate similar parts.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An apparatus for brewing beverage coffee, comprising a holder for a supply of green coffee beans, a roaster drum connected to said holder, motor driven means for feeding a certain quantity of beans to said drum, a first heater adjacent to the drum for roasting the green beans in the drum for a predetermined length of time, motor driven means for discharging roasted beans from said drum, a motor driven conveyor connected to the drum for receiving the discharged roasted beans, a motor driven grinder connected to said conveyor for receiving roasted beans therefrom and pulverizing the roasted beans, a pair of beverage brewing devices, a main duct connecting the grinder to said device for receiving coffee grounds from the grinder, a pair of duct branches, valve means in the main duct for diverting the coffee grounds from the grinder to either one of the duct branches, a pair of brewing devices including liquid containers open to said duct branches respectively for alternately receiving grounds therefrom, and a pair of other heaters adjacent to the respective brewing devices for heating liquid therein for a predetermined length of time to brew said beverage.

2. An apparatus for brewing beverage coffee, comprising a holder for a supply of green coffee beans, a roaster drum connected to said holder, motor driven means for feeding a certain quantity of beans to said drum, a first heater adjacent to the drum for roasting the green beans in the drum for a predetermined length of time, motor driven means for discharging roasted beans from said drum, a motor driven conveyor connected to the drum for receiving the discharged roasted beans, a motor driven grinder connected to said conveyor for receiving roasted beans therefrom and pulverizing the roasted beans, a pair of beverage brewing devices, a main duct connecting the grinder to said devices for receiving coffee grounds from the grinder, a pair of duct branches, valve means in the main duct for diverting the coffee grounds from the grinder to either one of the duct branches, a pair of brewing devices including liquid containers open to said duct branches respectively for alternately receiving grounds therefrom, and a pair of other heaters adjacent to the respective brewing devices for heating liquid therein for a predetermined length of time to brew said beverage, and timer control means in circuit with the motors and heaters for energizing each of the motors and heaters in turn in a predetermined sequence.

3. An apparatus for brewing beverage coffee, comprising a holder for a supply of green coffee beans, a roaster drum connected to said holder, motor driven means for feeding a certain quantity of beans to said drum, a first heater adjacent to the drum for roasting the green beans in the drum for a predetermined length of time, motor driven means for discharging roasted beans from said drum, a motor driven conveyor connected to the drum for receiving the discharged roasted beans, a motor driven grinder connected to said conveyor for receiving roasted beans therefrom and pulverizing the roasted beans, a pair of beverage brewing devices, a main duct connecting the grinder to said devices for receiving coffee grounds from the grinder, a pair of duct branches, valve means in the main duct for diverting the coffee grounds from the grinder to either one of the duct branches, a pair of brewing devices including liquid containers open to said duct branches respectively for alternately receiving grounds therefrom, and a pair of other heaters adjacent to the respective brewing devices for heating liquid therein for a predetermined length of time to brew said beverage, each of said brewing devices further including means for filling the containers with water, means for draining water out of the containers, a first electrically controlled valve controlling supply of water to the containers, a second electrically controlled valve controlling the drain means, and timer control means in circuit with the duct valve means, the first and second electrically controlled valves, the motors, heaters, valve means, and valves are energized in a predetermined time sequence after the beverage is drawn off from any one of the containers.

4. An apparatus for brewing beverage coffee, comprising a holder for a supply of green coffee beans, a roaster drum connected to said holder, motor driven means for feeding a certain quantity of beans to said drum, a first heater adjacent to the drum for roasting the green beans in the drum for a predetermined length of time, motor driven means for discharging roasted beans from said drum, a motor driven conveyor connected to the drum for receiving the discharged roasted beans, a motor driven grinder connected to said conveyor for receiving roasted beans therefrom and pulverizing the roasted beans, a pair of beverage brewing devices, a main duct connecting the grinder to said devices for receiving coffee grounds from the grinder, a pair of duct branches, valve means in the main duct for diverting the coffee grounds from the grinder to either one of the duct branches, a pair of brewing devices including liquid containers open to said duct branches respectively for alternately receiving grounds therefrom, and a pair of other heaters adjacent to the respective brewing devices for heating liquid therein for a predetermined length of time to brew said beverage, each of said brewing devices including means for filling the containers with water, a first electrically controlled valve limiting supply of water to only one of the containers at a time, means for draining water out of the containers, a second electrically controlled valve limiting drainage of water out of the containers to only one of the containers at a time, switch means controlling the energizing of the other heaters and limiting heating of the same to only one of the other heaters at a time, and timer control means in circuit with the duct valve means, the first and second electrically controlled valves, the motors and heaters, whereby the motors, the first heater, the valves, valve means and only one of the other heaters at a time are energized in a predetermined time sequence after the beverage is drawn off from any one of the containers.

5. An apparatus for brewing beverage coffee, comprising a holder for a supply of green coffee beans, a roaster drum connected to said holder, motor driven means for feeding a certain quantity of beans to said drum, a first heater adjacent to the drum for roasting the green beans in the drum for a predetermined length of time, motor driven means for discharging roasted beans from said drum, a motor driven conveyor connected to the drum for receiving the discharged roasted beans, a motor driven grinder connected to said conveyor for receiving roasted beans therefrom and pulverizing the roasted beans, a beverage brewing device including a liquid container adjacent said grinder for receiving coffee grounds therefrom, a second heater adjacent to said device for heating said liquid for a predetermined length of time to brew said beverage, a timer device in circuit with the bean feed motor, the bean discharge motor, conveyor motor, grinder motor, and the heaters for energizing each of the motors and heaters in turn in a predetermined sequence, said time device including sector contact plates on an insulated disc connected to the motors and heaters respectively, a contact arm rotatable over said disc, a timer motor driving said arm whereby said arm contacts said plates in turn for energizing said motor and heaters in said sequence, and a hopper for receiving roasted beans and a dispenser associated with said hopper interposed between the conveyor and the grinder.

References Cited in the file of this patent
UNITED STATES PATENTS
2,906,193    McCauley _____ Sept. 29, 1959